(12) United States Patent
Elman et al.

(10) Patent No.: US 6,853,424 B2
(45) Date of Patent: Feb. 8, 2005

(54) LIQUID CRYSTAL CELL WITH COMPENSATOR LAYER AND PROCESS

(75) Inventors: James F. Elman, Fairport, NY (US); Dennis J. Massa, Pittsford, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 10/431,765

(22) Filed: May 8, 2003

(65) Prior Publication Data

US 2004/0027521 A1 Feb. 12, 2004

Related U.S. Application Data

(63) Continuation-in-part of application No. 10/211,467, filed on Aug. 2, 2002.

(51) Int. Cl.[7] .............................................. G02F 1/1335
(52) U.S. Cl. .................... 349/117; 349/118; 349/119; 349/120; 349/121
(58) Field of Search ................................. 349/117–121

(56) References Cited

U.S. PATENT DOCUMENTS

| | | | |
|---|---|---|---|
| 5,344,916 A | * | 9/1994 | Harris et al. ................. 528/353 |
| 5,472,635 A | | 12/1995 | Iida et al. |
| 5,480,964 A | | 1/1996 | Harris et al. |
| 5,580,950 A | | 12/1996 | Harris et al. |
| 5,657,140 A | * | 8/1997 | Xu et al. ..................... 349/118 |
| 5,699,136 A | | 12/1997 | Arakawa et al. |
| 6,380,996 B1 | | 4/2002 | Yokoyama et al. |
| 6,512,561 B1 | * | 1/2003 | Terashita et al. ............. 349/118 |

FOREIGN PATENT DOCUMENTS

| | | |
|---|---|---|
| JP | 99095208 | 4/1999 |
| WO | 01/31394 | 5/2001 |

OTHER PUBLICATIONS

J. F. Elman, et al., "Multilayer Optical Compensator, Liquid Crystal Display, and Process", USSN 10/ , (D–84083) filed Aug. 2, 2002.

* cited by examiner

Primary Examiner—Robert H. Kim
Assistant Examiner—George Y. Wang
(74) Attorney, Agent, or Firm—Arthur E. Kluegel

(57) ABSTRACT

Disclosed is a liquid crystal cell having contiguous to a surface of a constraint thereof one or more compensator layers, each containing a transparent amorphous polymeric birefringent material having an out-of plane birefringence more negative than –0.005. The invention also provides a liquid crystal display and a process for making such a cell.

23 Claims, 3 Drawing Sheets

LIQUID CRYSTAL CELL WITH COMPENSATOR LAYER AND PROCESS

CROSS-REFERENCE TO RELATED APPLICATION

This application is a continuation-in-part of copending U.S. Ser. No. 10/211,467 filed Aug. 2, 2002, the contents of which are incorporated herein by reference.

FIELD OF THE INVENTION

The present invention relates to a liquid crystal cell having contiguous to an exterior surface of a constraint thereof a compensator layer containing an amorphous polymeric birefringent material having an out-of plane birefringence more negative than −0.005. The invention also provides an LC display and a process for making such a cell.

BACKGROUND OF THE INVENTION

Triacetylcellulose (TAC, also called cellulose triacetate) film has traditionally been used by the photographic industry due to its unique physical properties and flame retardance. TAC film is also the preferred polymer film for use as a cover sheet for the polarizers used in liquid crystal displays. It is the preferred material for this use because of its extremely low in-plane birefringence. Its out of plane birefringence is also small (but not zero), and is useful in providing some optical compensation to the LCD.

Intrinsic birefringence describes the fundamental orientation of a material at a molecular level. It is directly related to the molecular structure (bond angles, rotational freedom, presence of aromatic groups, etc.) of the material. The intrinsic birefringence is not affected by process conditions (temperature, stresses, pressures) used to make a macroscopic object.

Crystalline and liquid crystalline materials have the convenient property that their intrinsic birefringence manifests itself almost perfectly when they are assembled into a macroscopic article. Layers of crystalline and liquid crystalline molecules often can be manufactured such that all the molecules in the article are in registry with each other and thus preserve their fundamental orientation. The same is not true when making layers of an amorphous polymeric material. Their intrinsic birefringence can be highly modified by the manufacturing process. Thus, the measured birefringence of an actual article will be a resultant of its intrinsic birefringence and the manufacturing process. Because we are dealing with such amorphous polymeric materials, the following definitions refer to this measured birefringence and not intrinsic birefringence.

In-plane birefringence means the difference between $n_x$ and $n_y$, where x and y lie in the plane of the layer. $n_x$ will be defined as being parallel to the casting direction of the polymer, and $n_y$ being perpendicular to the casting direction of the polymer film. The sign convention used will be $n_x - n_y$.

Out of-plane birefringence means the difference between $n_z$ and the average of $n_x$ and $n_y$, where x and y lie in the plane of the layer and z lies in the plane normal to the layer. The sign convention used will be: $n_z - [(n_x + n_y)/2]$. TAC typically has a negative out of plane birefringence as its $n_z$ is smaller than its $n_x$ and $n_y$.

In-plane retardation (Re) means the product of in-plane birefringence and layer thickness (t). Thus $Re = t(n_x - n_y)$.

Out-of-plane retardation (Rth) means the product of out-of-plane birefringence and layer thickness (t). Thus $Rth = t(n_z - [(n_x + n_y)/2])$.

Synthetic polymer films (such as polycarbonate or polysulfone) are often used to enhance the minimal optical compensation that TAC provides. These synthetic polymers films are attached to the rest of the display by adhesive lamination.

Generally in the field of optical materials, the synthetic polymer film is used as an optically anisotropic film (having a high retardation value), while a TAC film is used as an optical isotropic film (having a low retardation value).

Japanese Published Patent Application JP1999-95208 describes a liquid crystal display having an optical compensator (having high retardation) prepared by uniaxial stretching of a high polymer film. Such polymers include polyesters, polycarbonate or polysulfone. This stretching step is essential to obtain the desired optical properties. This stretching affects both in- and out-of-plane retardation simultaneously. These two orthogonal retardations cannot be independently controlled by this method. Also, producing uniform optical compensators by this method is described as being difficult.

This application also describes a compensator where the inventor uses an exfoliated inorganic clay material in a polymeric binder coated on top of a TAC support. The exfoliated inorganic clay material in this layer is the optically active material, not the polymeric binder.

World patent WO 01/31394 A2 discusses the use of the color filter array layer as a source of additional out-of-plane retardation for a liquid crystal display. The color filter array is located within the constraints of the liquid crystal cell. The use of an aromatic polyimide binder rather than a polyacrylate binder for the color filter array dyes provides enhanced retardation. The overall retardation is achieved with the combination of the color filter array retarder plus optional additional out-of-plane retardation from the TAC used as a supporting member for the polarizers.

The proposal to select the binder for the color filter array with retardation in mind has an advantage versus polarizer-based retarders that are laminated to the liquid crystal cell: mechanical stresses to the display induced by room condition changes or perhaps direct shock can cause polarizer-based retarders to move relative to the liquid crystal cell. Retarders coated directly on the glass substrate are more rigidly held in registry with the cell, and thus do not suffer this problem. However the requirement that this color filter array be also a retarder means that this layer must serve two purposes: color filtering and adding retardation. This limits the potential thickness to be considered for this layer. This layer must also be pixilated, and this adds additional complications. Finally it is taught on the internal surface of the constraint only, where the color filter array is located.

It is a problem to be solved to provide a liquid crystal cell that is readily manufactured and that readily provides the required degree of in-plane and out-of-plane compensation while reducing the problems associated with a laminated compensator.

SUMMARY OF THE INVENTION

The invention provides liquid crystal cell having contiguous to a surface of a constraint thereof one or more compensator layers, each containing a transparent amorphous polymeric birefringent material having an out-of plane birefringence more negative than −0.005. The invention also provides a liquid crystal display and a process for preparing a compensator of the invention.

The invention cell is readily manufactured and provides the required degree of in-plane and out-of-plane compensation.

DETAILED DESCRIPTION OF THE INVENTION

Figure 1A:
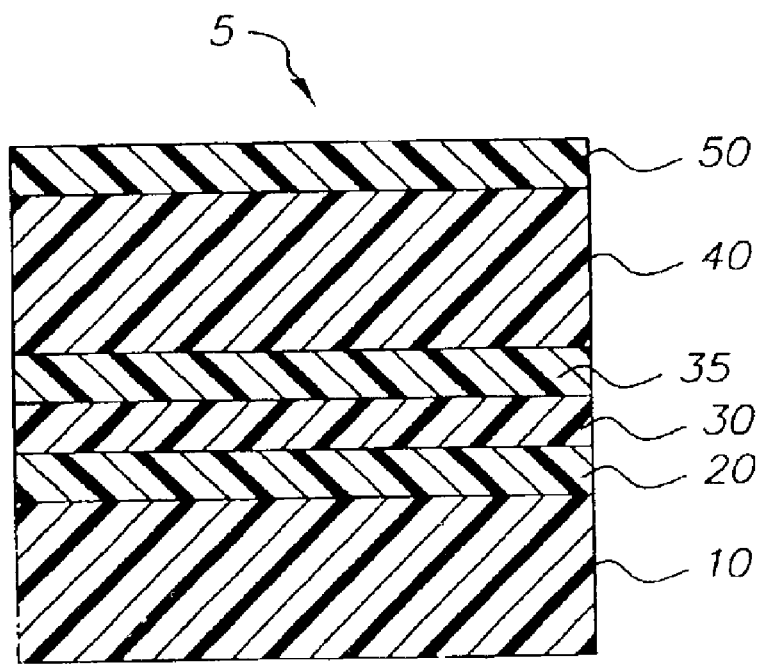
FIG. 1A is a cross-sectional schematic of an embodiment of the invention with the amorphous polymeric compensator layer on the side of the constraint opposite the liquid crystal

The invention is summarized above.

The present invention is not limited by the requirements of WO 01/31394 mentioned above.

The present invention provides a liquid crystal cell having contiguous to at least one surface of a constraint thereof a compensator layer containing a birefringent amorphous polymeric material having an out-of plane birefringence more negative than −0.005.

As used herein, constraints are the two principal supporting members of the LC cell (typically glass) that sandwich the switchable liquid crystal layer (and typically the color filter array, black matrix, and thin film transistor, alignment and electrode layers, and other optional layers) and are normally at least 10 micrometers thick. The term "transparent" is used in its normal sense to mean a layer that absorbs little or no visible light.

The liquid crystal cell referred to herein extends from the external surface of one constraint to the other, including any compensator layer on the constraint surfaces.

Amorphous polymeric materials are used for this optical compensator. In this case amorphous means that the optical compensator would not produce any sharp diffraction peaks when exposed to X-ray diffraction analysis. Crystalline polymers, liquid crystal molecules and crystalline inorganic materials would produce such sharp peaks when subjected to such X-ray diffraction analysis. Such amorphous materials are desirably suitable to be solvent cast or coated such as TAC, polycarbonates, cyclic polyolefins, polyesters, and polyimides.

Typical lamination uses pressure sensitive adhesive layers of greater than 4 micrometers in thickness. As used herein, the term contiguous means without the use of any intervening laminating adhesive layer and therefore contemplates the possible use of only a very thin (0.2 $\mu$m or less) adhesion promoting layer or an adhesion promoting surface treatment such as corona discharge, plasma glow discharge, or flame treatment. Other adhesion enhancing methods could be employed as known to those skilled in the art.

The compensator layer will typically be solvent coated onto the constraint exterior surface. This solvent coating could be accomplished by spin coating, hopper coating, gravure coating, wire bar coating, spray coating, or other coating methods known to those skilled in the art.

The compensator layer is coated from a solution containing a polymer that yields high negative birefringence upon solvent coating. To produce negative birefringence (negative retardation), polymers that contain non-visible chromophore groups such as vinyl, carbonyl, amide, imide, ester, carbonate, sulfone, azo, and aromatic groups (i.e. benzene, naphthalate, biphenyl, bisphenol A) in the polymer backbone will be used, such as polyesters, polycarbonates, polyimides, polyetherimides, and polythiophenes. One could also add fillers and non-polymeric molecules to these polymers for this contiguous layer.

Examples of suitable polymers for use in the second layer are 1) poly(4,4'-hexafluoroisopropylidene-bisphenol) terephthalate-co-isophthalate, 2) poly(4,4'-hexahydro-4,7-methanoindan-5-ylidene bisphenol) terephthalate, 3) poly(4,4'-isopropylidene-2,2'6,6'-tetrachlorobisphenol) terephthalate-co-isophthalate, 4) poly(4,4'-hexafluoroisopropylidene)-bisphenol-co-(2-norbornylidene)-bisphenol terephthalate, 5) poly(4,4'-hexahydro-4,7-methanoindan-5-ylidene)-bisphenol-co-(4,4'-isopropylidene-2,2',6,6'-tetrabromo)-bisphenol terephthalate, and 6) poly(4,4'-isopropylidene-bisphenol-co-4,4'-(2-norbornylidene)bisphenol) terephthalate-co-isophthalate or copolymers of any of the foregoing.

A chromophore is defined as an atom or group of atoms that serve as a unit in light adsorption. (*Modern Molecular Photochemistry* Nicholas J. Turro Editor, Benjamin/Cummings Publishing Co., Menlo Park, Calif. (1978) Pg 77). Typical chromophore groups include vinyl, carbonyl, amide, imide, ester, carbonate, aromatic (i.e. phenyl, naphthyl, biphenyl, thiophene, bisphenol), sulfone, and azo or combinations of these chromophores. A non-visible chromophore is one that has an absorption maximum outside the range of 400–700 nm.

Desirably, polymers to be used in the compensator layer will not have chromophores off of the backbone. An example of such an undesirable polymer with chromophores in and off the backbone would be polyarylates possessing significant proportions of the fluorene group.

The glass transition temperature (Tg) of the polymers used in the compensator layer is significant. Tg values above 180° C. are desirable to achieve preferred results.

The polymers used in the contiguous compensator layer can be synthesized by a variety of techniques: condensation, addition, anionic, cationic or other common methods of synthesis can be employed.

The thickness of this layer is usually less than 30 $\mu$m. Typically it is from 0.1 $\mu$m to 20 $\mu$m. Conveniently it is from 1.0 $\mu$m to 10 $\mu$m and desirably from 2 $\mu$m to 8 $\mu$m.

The compensator layer is suitably of sufficient thickness so that the out-of-plane retardation of the second layer is more negative than −20 nm. Typically it is from −600 to −60 nm. Conveniently it is from −500 to −100 nm and desirably from −400 to −150 nm.

Compared to WO 01/31394, the compensator layer(s) can be applied onto any and/or all of the four surfaces provided by the two liquid crystal constraints (be they glass or some other very low birefringence material). Further, the applied layers are not limited in thickness due to their coloration since they are transparent. Finally the materials suitable for these contiguous amorphous polymeric compensator layers are much broader than the aromatic polyimides of '394. A wide variety of amorphous, high glass transition temperature, polymeric materials are identified that will serve this purpose.

The invention is described in more detail by referring to the drawings as follows.

FIG. 1A shows a cross-sectional schematic of part of a liquid crystal display 5 including an amorphous polymeric compensator layer 50 and constraint 40 in accordance with the present invention. Also shown are the switchable liquid crystal 10, an alignment layer 20, a TFT (thin film transistor) layer 30, and a color filter array 35. The said amorphous polymeric compensator layer 50 having an out-of-plane birefringence more negative than −0.005, and the combined in-plane retardation (Re) of layers 20, 30, 35, 40 and 50 is from +20 to −20 nm and the out-of-plane retardation (Rth) of layer 50 is more negative than −20 nm.

Figure 1B:
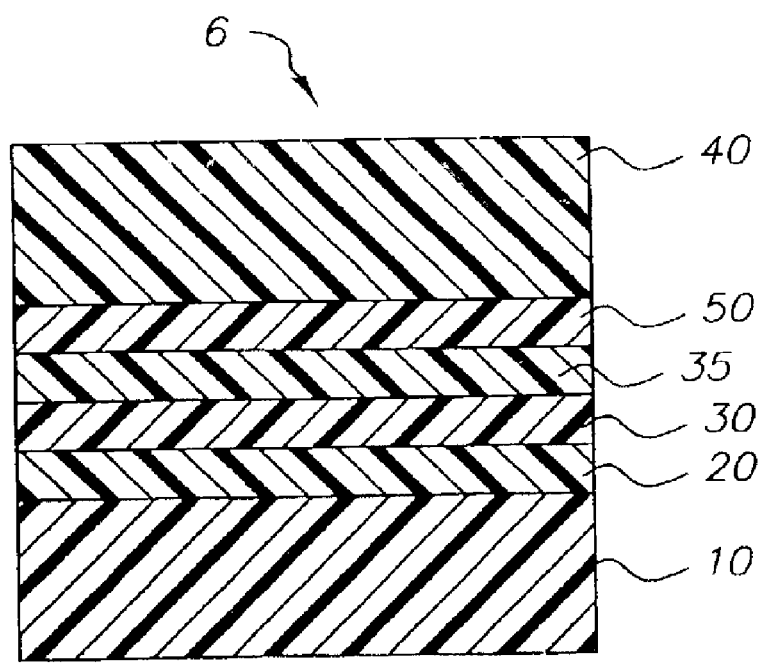
FIG. 1B is a cross-sectional schematic of an embodiment of the invention with the amorphous polymeric compensator layer on the side of the constraint adjacent to the liquid crystal

FIG. 1B shows a cross-sectional schematic of part of another liquid crystal display 6 including an amorphous polymeric compensator layer 50 and constraint 40 in accordance with the present invention. Also shown are the switchable liquid crystal 10, an alignment layer 20, a TFT (thin film transistor) layer 30, and a color filter array 35. The said amorphous polymeric compensator layer 50 having an out-of-plane birefringence more negative than −0.005, and the combined in-plane retardation (Re) of layers 20, 30, 35, 40 and 50 is from +20 to −20 nm and the out-of-plane retardation (Rth) of layer 50 is more negative than −20 nm. In this embodiment layer 50 is on the other side of the constraint as compared to FIG. 1A.

Figure 2A:
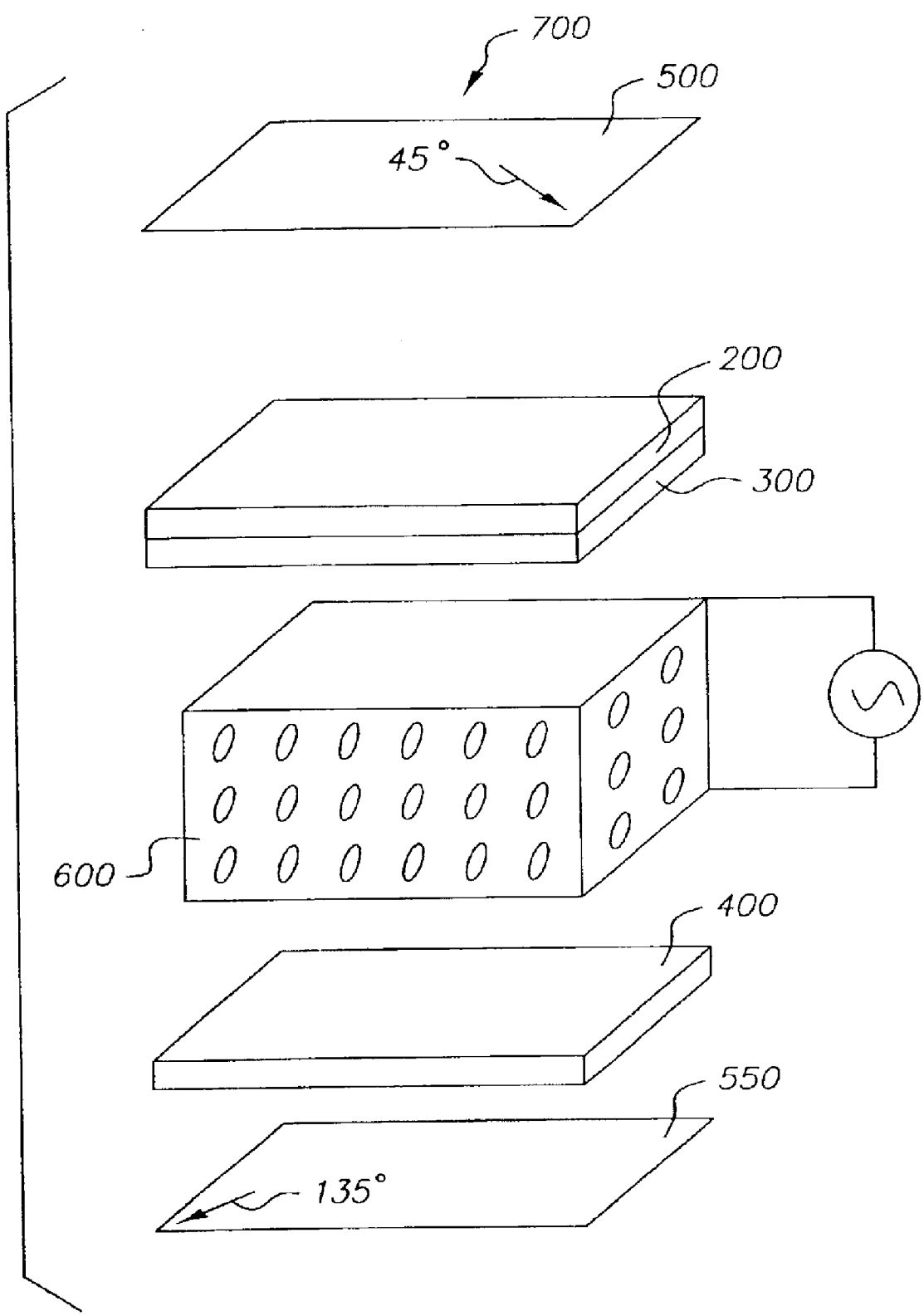
FIG. 2A is an exploded view schematic of a liquid crystal display with one amorphous polymeric compensator layer of the invention

FIG. 2A shows a liquid crystal display 700 having an amorphous polymeric compensator layer 200, a constraint 300 with alignment layer/TFT layer/color filter array on one side of the electrically switchable liquid crystal 600, a second constraint 400 with alignment layer/TFT layer which is on the other side of the electrically switchable liquid crystal 600, and polarizers 500 and 550. The transmission axes of polarizers 500 and 550 form a 90°±10° angle relative to each other. The angles of their transmission axes are denoted as 45° and 135° relative to the liquid crystal display 700. However, other angles are possible depending on the kind of liquid crystal display 700 and this is obvious to those who skilled in the art.

Figure 2B:
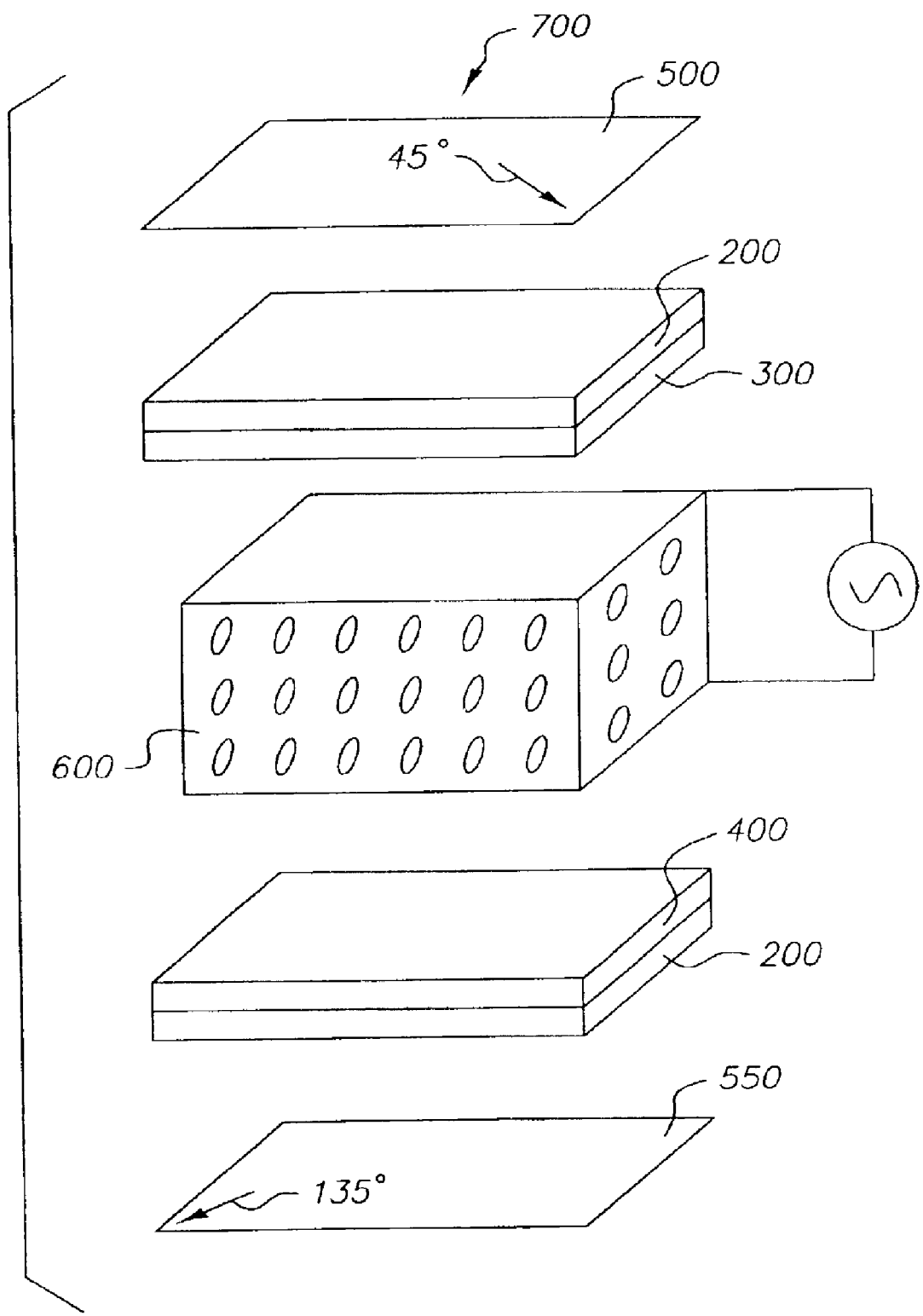
FIG. 2B is an exploded view schematic of a liquid crystal display with two amorphous polymeric compensator layers of the invention

FIG. 2B shows another liquid crystal display 700 having two amorphous polymeric compensator layers 200, a constraint 300 with alignment layer/TFT layer/color filter array on one side of the electrically switchable liquid crystal 600, a second constraint 400 with alignment layer/TFT layer which is on the other side of the electrically switchable liquid crystal 600, and polarizers 500 and 550. The transmission axes of polarizers 500 and 550 form a 90°±10° angle relative to each other. The angles of their transmission axes are denoted as 45° and 135° relative to the liquid crystal display 700. However, other angles are possible depending on the kind of liquid crystal display 700 and this is obvious to those who skilled in the art.

Among the liquid crystal cell arrangements useful with the invention are Vertically Aligned (VA) and In-Plane Switching (IPS) cells. In the Vertically Aligned arrangement, the liquid crystal display is one in which electric field is applied in a direction perpendicular to or vertical with respect to the cell plane and the direction of the liquid crystal optic axis is substantially perpendicular to or vertical with respect to the liquid crystal cell plane without an applied field. Therefore, the incoming light essentially does not see the birefringence through the liquid crystal cell. This state is termed the "dark state". In the In-plane switching arrangement, the electric field is applied in the direction of the liquid crystal plane and the direction of the liquid crystal optic axis is changed upon application of the electric field while remaining substantially within the plane of the cell.

The present invention is further illustrated by the following non-limiting examples of its practice.

EXAMPLES

The aromatic polyesters used herein can be prepared using any suitable or conventional procedure. The procedure used herein followed that outlined by P. W. Morgan in Condensation Polymers: By Interfacial and Solution Methods, Interscience, New York City, N.Y. (1965).

Example 1

Polymer I (Synthesis)

To a stirred mixture of 4,4"-hexafluoroisopropylidene-diphenol (33.62 g, 0.1 mole) and triethylamine (22.3 g, 0.22 mole) in methylene chloride (200 mL) at 10° C. was added a solution of terephthaloyl chloride (10.15 g, 0.05 mole) and isophthaloyl chloride (10.15 g, 0.05 mole) in methylene chloride (100 mL). After the addition, the temperature was allowed to rise to room temperature and the solution was stirred under nitrogen for 4 hours, during which time triethylamine hydrochloride precipitated in a gelatinous form and the solution became viscous. The solution was then filtered and washed with dilute hydrochloric acid, (100 mL of 2% acid) followed three times by water (200 mL). The solution was then poured into methanol with vigorous stirring, and a white fibrous polymer precipitated. The glass transition temperature of this polymer was measured by differential scanning calorimetry to be 199° C.

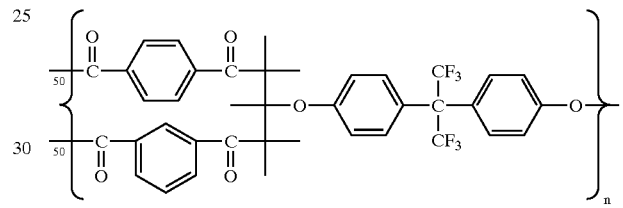

Poly(4,4'-hexafluoroisopropylidene-bisphenol) terephthalate-co-isophthalate

Polymer I

A solution of the polyester (polymer I, 10% solids, 45% methylethylketone, 45% toluene) was coated onto a TAC web. This included the steps of unrolling the TAC web, coating the polymer solution (using a slot hopper), and applying sufficient drying (85° C.) to remove the majority of the solvents. These steps occurred in a roll to roll, continuous process. Spin coating and other coating methods such as spray application could also be used. Optically clear films of the TAC/polyester structure were produced with the following optical properties. Re, Rth and the second layer thickness were measured with an ellipsometer (model M2000V, J.A. Woollam Co.) at 550 nm wavelength.

TABLE I

| First Layer | Second Layer: Polymer I Layer thickness (μm) | Combined Re, In-Plane Retardation (nm) | Combined Rth, Out-of-Plane Retardation (nm) |
|---|---|---|---|
| 80 μm TAC | 0 | 3 | −58 |
| 80 μm TAC | 2.8 | 3 | −84 |
| 80 μm TAC | 5.6 | 3 | −104 |

Example 2

Polymer II was similarly prepared using terephthaloyl chloride and 4,4'-(hexahydro-4,7-methanoindan-5-ylidene) bisphenol. The glass transition temperature of this polymer was measured by differential scanning calorimetry to be 289° C.

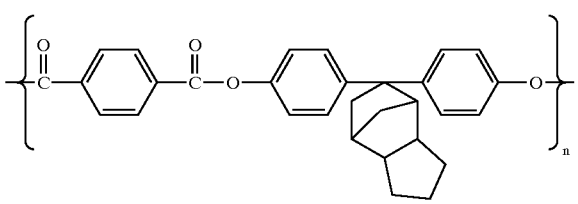

Poly(4,4'-hexahydro-4,7-methanoindan-5-ylidene bisphenol) terephthalate

Polymer II

When polymer II is spun cast onto a glass substrate (10% solids in dichloroethane), it shows the following optical retardations. Re, Rth and the polymer II layer thickness are measured with an ellipsometer (model M2000V, J.A. Woollam Co.) at 550 nm wavelength.

TABLE II

| Polymer II Layer thickness (μm) | Re, In-Plane Retardation (nm) | Rth, Out-of-Plane Retardation (nm) |
|---|---|---|
| 3.4 | 0.2 | −74 |

Example 3

Polymer III was similarly prepared using terephtaloyl chloride, isophthaloyl chloride and 4,4'-isopropylidene-2,2',6,6'-tetrachlorobisphenol. The glass transition temperature of this polymer was measured by differential scanning calorimetry to be 250° C.

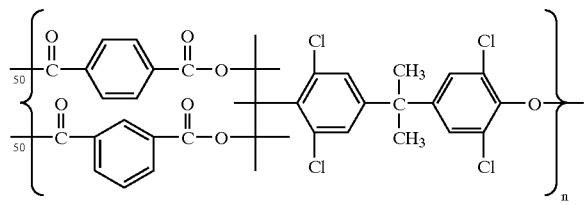

Poly(4,4'-isopropylidene-2,2'6,6'-tetrachlorobisphenol) terephthalate-co-isophthalate Polymer III When polymer III is spun cast onto glass (10% solids in dichloroethane), it shows the following optical retardations. Re, Rth and the polymer III layer thickness are measured with an ellipsometer (model M2000V, J.A. Woollam Co.) at 550 nm wavelength.

TABLE III

| Polymer III Layer thickness (μm) | Re, In Plane Retardation (nm) | Rth, Out of Plane Retardation (nm) |
|---|---|---|
| 2.8 | 0.8 | −66 |

Example 4

Polymer IV (Synthesis)

To a stirred mixture of 4,4'-hexafluoroisopropylidene-diphenol (23.53 g, 0.07 mole), 4,4'-(2-norbornylidene) bisphenol (8.4 g, 0.03 mole) and triethylamine (22.3 g, 0.22 mole) in methyl ethyl ketone (100 mL) at 10° C. was added a solution of terephthaloyl chloride (19.29 g, 0.095 mole) and isophthaloyl chloride (1.02 g, 0.005 mole) in methyl ethyl ketone (60 mL). After the addition, the temperature was allowed to rise to room temperature and the solution was stirred under nitrogen for 4 hours, during which time triethylamine hydrochloride precipitated in a gelatinous form and the solution became viscous. The solution was then diluted with toluene (160 mL) and washed with dilute hydrochloric acid, (200 mL of 2% acid) followed three times by water (200 mL). The solution was then poured into ethanol with vigorous stirring, and a white bead like polymer precipitated, collected and dried at 50° C. under vacuum for 24 hours. The glass transition temperature of this polymer was measured by differential scanning calorimetry to be 270° C.

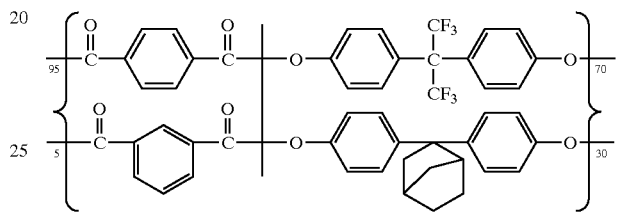

Poly(4,4'-hexafluoroisopropylidene-bisphenol-co-4,4'-(2-norbornylidene)bisphenol) terephthalate-co-isophthalate Polymer IV When polymer IV is spun cast onto glass (10% solids in 50% propylacetate 50% toluene), it shows the following optical retardations. Re, Rth and the polymer III layer thickness are measured with an ellipsometer (model M2000V, J.A. Woollam Co.) at 550 nm wavelength.

TABLE IV

| Polymer IV Layer thickness (μm) | Re, In Plane Retardation (nm) | Rth, Out of Plane Retardation (nm) |
|---|---|---|
| 5.9 | 0.2 | −221 |

Other specific polymers that could be used include:

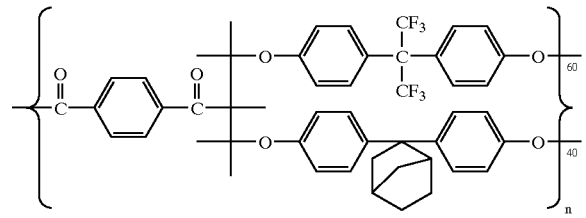

Poly(4,4'-hexafluoroisopropylidene)-bisphenol-co-
(2-norbornylidene)-bisphenol terephthalate. (60/40)

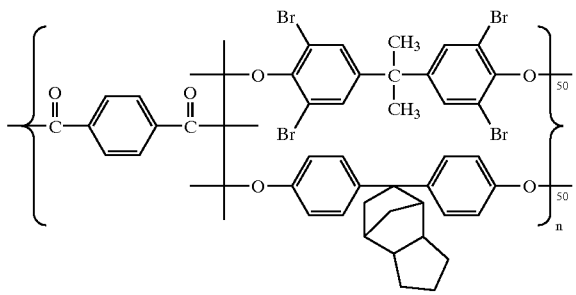

Poly(4,4'-hexahydro-4,7-methanoindan-5-ylidene)-
bisphenol-co-(4,4'-isopropylidene-2,2',6,6'-
tetrabromo)-bisphenol terephthalate. (50/50)

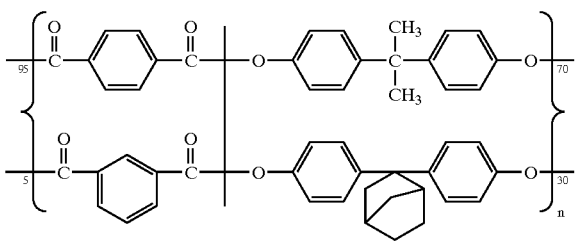

Poly(4,4'-isopropylidene-bisphenol-co-4,4'-(2-
norbornylidene) bisphenol) terephthalate-co-
isophthalate A series of polymers were analyzed for their glass transition temperatures and out of plane birefringence values. It was found that the more desirable polymers for this invention had glass transition temperatures above 180° C. Those with lower glass transition temperatures were found to generally have birefringence values less negative than −0.005.

The invention has been described in detail with particular reference to certain preferred embodiments thereof, but it will be understood that variations and modifications can be effected within the scope of the invention.

PARTS LIST

| | |
|---|---|
| 5 | compensator/constraint according to the present invention |
| 10 | liquid crystal |
| 20 | alignment layer |
| 30 | transparent conductive layer |
| 40 | constraint |
| 50 | polymeric layer having high birefringence |
| 200 | polymeric layer having high birefringence |
| 300 | constraint with transparent conductive layer/alignment layer |
| 500 | polarizer |
| 550 | polarizer |
| 600 | liquid crystal |
| 700 | liquid crystal display |

What is claimed is:

1. A liquid crystal cell having contiguous to a surface of a constraint thereof, where contiguous means without the use of any intervening laminating adhesive layer of 0.2 μm or less, one or more compensator layers, each containing a transparent amorphous polymeric birefringent material having an out-of plane birefringence more negative than −0.005, wherein the one or more compensator layers have a combined thickness of less than 30 micrometers, where amorphous means the compensator would not produce any sharp diffraction peaks when exposed to X-ray diffraction analysis.

2. The cell of claim 1 bearing more than one of said polymeric compensator layers.

3. The cell of claim 1 comprising compensator layers containing selected polymeric materials having sufficient thickness so that the overall in-plane retardation (Re) of all of the compensator layers of the liquid crystal cell is from +20 to −20 nm and the out-of-plane retardation (Rth) of at least one of the compensator layers is more negative than −20 nm.

4. The cell of claim 1 comprising at least two compensator layers.

5. The cell of claim 1 wherein the one or more compensator layers have a combined thickness of from 0.1 to 20 micrometers.

6. The cell of claim 5 wherein the one or more compensator layers have a combined thickness of from 1.0 to 10 micrometers.

7. The cell of claim 6 wherein the one or more compensator layers have a combined thickness of from 2 to 8 micrometers.

8. The cell of claim 1 wherein the Rth of the one or more compensator layers is −60 nm or more negative.

9. The cell of claim 1 wherein the Rth of the one or more compensator layers is from −60 to −600 nm.

10. The cell of claim 1 wherein the Rth of the one or more compensator layers is from −150 to −500 nm.

11. The cell of claim 1 wherein the one or more compensator layers comprise a polymer containing in the backbone a non-visible chromophore group and having a glass transition temperature (Tg) above 180° C.

12. The cell of claim 11 wherein the compensator layer comprises a polymer containing in the backbone a carbonyl or an aromatic group.

13. The cell of claim 11 wherein the non-visible chromophore group includes a carbonyl, amide, imide, ester, carbonate, phenyl, naphthyl, biphenyl, bisphenol, or thiophene group.

14. The cell of claim 11 wherein the compensator layer comprises 1) poly(4,4'-hexafluoroisopropylidene-bisphenol) terephthalate-co-isophthalate, 2) poly(4,4'-hexahydro-4,7-methanoindan-5-ylidene bisphenol) terephthalate, or 3) poly(4,4'-isopropylidene-2,2'6,6'-tetrachlorobisphenol) terephthalate-co-isophthalate, 4) poly(4,4'-hexafluoroisopropylidene)-bisphenol-co-(2-norbornylidene)-bisphenol terephthalate; 5) poly(4,4'-hexahydro-4,7-methanoindan-5-ylidene)-bisphenol-co-(4,4'-isopropylidene-2,2',6,6'-tetrabromo)-bisphenol terephthalate; or 6) poly(4,4'-isopropylidene-bisphenol-co-4,4'-(2-norbornylidene)bisphenol) terephthalate-co-isophthalate, or copolymers thereof.

15. The cell of claim 1 wherein the compensator layer comprises poly(4,4'-hexafluoroisopropylidene-bisphenol-co-4,4'-(2-norbornylidene)bisphenol) terephthalate-co-isophthalate, or copolymers thereof.

16. The cell of claim 11 wherein the compensator layer comprises a polymer containing in the backbone a non-visible chromophore group that does not contain a chromophore off of the backbone.

17. The cell of claim 1 wherein the liquid crystal cell is a vertically aligned cell or a twisted nematic cell.

18. The cell of claim 1 wherein the liquid crystal cell is In-Plane-Switchable.

19. The cell of claim 1 wherein the constraints are glass.

20. The cell of claim 1 wherein the surface is an exterior surface of the cell constraint.

21. A liquid crystal display comprising the liquid crystal cell of claim 1.

22. A process for forming a liquid crystal cell display comprising coating a transparent amorphous polymeric birefringent material having an out-of plane birefringence more negative than −0.005 in a solvent onto a surface of a constraint of the liquid crystal cell.

23. The process of claim 22 wherein the constraint is glass.

* * * * *